(12) United States Patent
Umeyama et al.

(10) Patent No.: US 10,644,354 B2
(45) Date of Patent: May 5, 2020

(54) METHOD OF MANUFACTURING NONAQUEOUS ELECTROLYTE SECONDARY BATTERY AND NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Harunari Shimamura, Toyonaka (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 508 days.

(21) Appl. No.: 14/995,719

(22) Filed: Jan. 14, 2016

(65) Prior Publication Data
US 2016/0211554 A1    Jul. 21, 2016

(30) Foreign Application Priority Data
Jan. 16, 2015    (JP) .................. 2015-006820

(51) Int. Cl.
*H01M 10/00*    (2006.01)
*H01M 10/0585*    (2010.01)
(Continued)

(52) U.S. Cl.
CPC ..... *H01M 10/0585* (2013.01); *H01M 2/1673* (2013.01); *H01M 2/1686* (2013.01);
(Continued)

(58) Field of Classification Search
CPC .......... H01M 10/0585; H01M 10/052; H01M 4/139; H01M 2/1673; H01M 2/1686; H01M 4/0471
See application file for complete search history.

(56) References Cited

U.S. PATENT DOCUMENTS

2005/0241137 A1* 11/2005 Suzuki ................. H01G 9/042
29/592.1
2006/0199294 A1* 9/2006 Fujikawa ............... H01M 2/16
438/42
(Continued)

FOREIGN PATENT DOCUMENTS

JP    2003-151638 A    5/2003
JP    2011-023186 A    2/2011
(Continued)

*Primary Examiner* — Nicholas P D'Aniello
(74) *Attorney, Agent, or Firm* — Sughrue Mion, PLLC

(57) ABSTRACT

A method of manufacturing a nonaqueous electrolyte secondary battery includes: a step of forming a first electrode mixture layer containing an electrode active material and a first binder; a step of forming granulated particles containing the electrode active material and a second binder; a step of forming a second electrode mixture layer, which is formed of the granulated particles, on the first electrode mixture layer; a step of forming a heat resistance layer, which contains an inorganic filler and a third binder, on a surface of a separator; a step of preparing an electrode body by laminating the electrode and the separator such that the second electrode mixture layer and the heat resistance layer are in contact with each other; and a step of heating the electrode body.

5 Claims, 14 Drawing Sheets

| SAMPLE No. | ELECTRODE | | | | | | | | SEPARATOR | | | HIGH-RATE CYCLE TEST |
|---|---|---|---|---|---|---|---|---|---|---|---|---|
| | POSITIVE ELECTRODE | | | | NEGATIVE ELECTRODE | | | | HEAT RESISTANCE LAYER | | | |
| | FIRST POSITIVE ELECTRODE MIXTURE LAYER | SECOND POSITIVE ELECTRODE MIXTURE LAYER | | THICK-NESS RATIO | FIRST NEGATIVE ELECTRODE MIXTURE LAYER | SECOND NEGATIVE ELECTRODE MIXTURE LAYER | | THICK-NESS RATIO | | | | |
| | FIRST BINDER | CONFIGU-RATION | SECOND BINDER | | FIRST BINDER | CONFIGU-RATION | SECOND BINDER | | THIRD LAYER | THICK-NESS | ARRANGE-MENT | RESISTANCE INCREASE RATE |
| | MASS% | — | MASS% | % | MASS% | — | MASS% | % | MASS% | μm | — | % |
| 7 | 2.0 | GRANULATED PARTICLE LAYER | 2.5 | 12 | 1.0 | GRANULATED PARTICLE LAYER | 4.0 | 12 | 4.0 | 4.5 | BOTH SURFACES | 60 |
| 8 | 2.0 | GRANULATED PARTICLE LAYER | 3.0 | 12 | 1.0 | GRANULATED PARTICLE LAYER | 4.0 | 12 | 4.0 | 4.5 | BOTH SURFACES | 15 |
| 9 | 2.0 | GRANULATED PARTICLE LAYER | 5.0 | 12 | 1.0 | GRANULATED PARTICLE LAYER | 4.0 | 12 | 4.0 | 4.5 | BOTH SURFACES | 10 |
| 10 | 2.0 | GRANULATED PARTICLE LAYER | 8.0 | 12 | 1.0 | GRANULATED PARTICLE LAYER | 4.0 | 12 | 4.0 | 4.5 | BOTH SURFACES | 14 |
| 11 | 2.0 | GRANULATED PARTICLE LAYER | 10.0 | 12 | 1.0 | GRANULATED PARTICLE LAYER | 4.0 | 12 | 4.0 | 4.5 | BOTH SURFACES | 17 |
| 12 | 2.0 | GRANULATED PARTICLE LAYER | 12.0 | 12 | 1.0 | GRANULATED PARTICLE LAYER | 4.0 | 12 | 4.0 | 4.5 | BOTH SURFACES | 70 |

(51) Int. Cl.
*H01M 2/16* (2006.01)
*H01M 4/04* (2006.01)
*H01M 4/139* (2010.01)
*H01M 10/052* (2010.01)

(52) U.S. Cl.
CPC ......... *H01M 4/0471* (2013.01); *H01M 4/139* (2013.01); *H01M 10/052* (2013.01)

(56) References Cited

U.S. PATENT DOCUMENTS

2009/0155678 A1* 6/2009 Less ................ H01M 2/1673
429/144
2010/0285356 A1 11/2010 Choi et al.

FOREIGN PATENT DOCUMENTS

| | | |
|---|---|---|
| JP | 2012014884 A | 1/2012 |
| JP | 2013187074 A | 9/2013 |
| JP | 2014049240 A | 3/2014 |
| KR | 1020100121387 A | 11/2010 |

* cited by examiner

FIG. 9

| SAMPLE No. | ELECTRODE - POSITIVE ELECTRODE | | | | | ELECTRODE - NEGATIVE ELECTRODE | | | | | SEPARATOR - HEAT RESISTANCE LAYER | | | HIGH-RATE CYCLE TEST |
|---|---|---|---|---|---|---|---|---|---|---|---|---|---|---|
| | FIRST POSITIVE ELECTRODE MIXTURE LAYER | SECOND POSITIVE ELECTRODE MIXTURE LAYER | | | THICK-NESS RATIO | FIRST NEGATIVE ELECTRODE MIXTURE LAYER | SECOND NEGATIVE ELECTRODE MIXTURE LAYER | | | THICK-NESS RATIO | THIRD LAYER | THICK-NESS | ARRANGE-MENT | RESISTANCE INCREASE RATE |
| | FIRST BINDER | CONFIGU-RATION | SECOND BINDER | | | FIRST BINDER | CONFIGU-RATION | SECOND BINDER | | | | | | |
| | MASS% | — | MASS% | | % | MASS% | — | MASS% | | % | MASS% | μm | — | % |
| 1 | 2.0 | GRANULATED PARTICLE LAYER | 4.0 | | 11 | 1.0 | GRANULATED PARTICLE LAYER | 4.0 | | 11 | 4.1 | 4.5 | BOTH SURFACES | 15 |
| 2 | 2.0 | COATING LAYER | 4.0 | | 11 | 1.0 | COATING LAYER | 4.0 | | 11 | 4.1 | 4.5 | BOTH SURFACES | 95 |
| 3 | 2.0 | GRANULATED PARTICLE LAYER | 4.0 | | 11 | 1.0 | GRANULATED PARTICLE LAYER | 4.0 | | 11 | 4.1 | 4.5 | POSITIVE ELECTRODE SIDE | 90 |
| 4 | 2.0 | GRANULATED PARTICLE LAYER | 4.0 | | 11 | 1.0 | GRANULATED PARTICLE LAYER | 4.0 | | 11 | 4.1 | 4.5 | NEGATIVE ELECTRODE SIDE | 91 |
| 5 | 2.0 | COATING LAYER | 4.0 | | 11 | 1.0 | GRANULATED PARTICLE LAYER | 4.0 | | 11 | 4.1 | 4.5 | BOTH SURFACES | 43 |
| 6 | 2.0 | GRANULATED PARTICLE LAYER | 4.0 | | 11 | 1.0 | COATING LAYER | 4.0 | | 11 | 4.1 | 4.5 | BOTH SURFACES | 45 |

FIG. 10

| SAMPLE No. | ELECTRODE | | | | | | NEGATIVE ELECTRODE | | | | SEPARATOR | | | HIGH-RATE CYCLE TEST |
|---|---|---|---|---|---|---|---|---|---|---|---|---|---|---|
| | POSITIVE ELECTRODE | | | | | | | | | | HEAT RESISTANCE LAYER | | | |
| | FIRST POSITIVE ELECTRODE MIXTURE LAYER | SECOND POSITIVE ELECTRODE MIXTURE LAYER | | | | FIRST NEGATIVE ELECTRODE MIXTURE LAYER | SECOND NEGATIVE ELECTRODE MIXTURE LAYER | | | | | | | |
| | FIRST BINDER | CONFIGU-RATION | SECOND BINDER | THICK-NESS RATIO | | FIRST BINDER | CONFIGU-RATION | SECOND BINDER | THICK-NESS RATIO | THIRD LAYER | THICK-NESS | ARRANGE-MENT | RESISTANCE INCREASE RATE |
| | MASS% | — | MASS% | % | | MASS% | — | MASS% | % | MASS% | μm | — | % |
| 7 | 2.0 | GRANULATED PARTICLE LAYER | 2.5 | 12 | | 1.0 | GRANULATED PARTICLE LAYER | 4.0 | 12 | 4.0 | 4.5 | BOTH SURFACES | 60 |
| 8 | 2.0 | GRANULATED PARTICLE LAYER | 3.0 | 12 | | 1.0 | GRANULATED PARTICLE LAYER | 4.0 | 12 | 4.0 | 4.5 | BOTH SURFACES | 15 |
| 9 | 2.0 | GRANULATED PARTICLE LAYER | 5.0 | 12 | | 1.0 | GRANULATED PARTICLE LAYER | 4.0 | 12 | 4.0 | 4.5 | BOTH SURFACES | 10 |
| 10 | 2.0 | GRANULATED PARTICLE LAYER | 8.0 | 12 | | 1.0 | GRANULATED PARTICLE LAYER | 4.0 | 12 | 4.0 | 4.5 | BOTH SURFACES | 14 |
| 11 | 2.0 | GRANULATED PARTICLE LAYER | 10.0 | 12 | | 1.0 | GRANULATED PARTICLE LAYER | 4.0 | 12 | 4.0 | 4.5 | BOTH SURFACES | 17 |
| 12 | 2.0 | GRANULATED PARTICLE LAYER | 12.0 | 12 | | 1.0 | GRANULATED PARTICLE LAYER | 4.0 | 12 | 4.0 | 4.5 | BOTH SURFACES | 70 |

FIG. 11

| SAMPLE No. | POSITIVE ELECTRODE | | | | NEGATIVE ELECTRODE | | | | SEPARATOR | | | HIGH-RATE CYCLE TEST |
|---|---|---|---|---|---|---|---|---|---|---|---|---|
| | FIRST POSITIVE ELECTRODE MIXTURE LAYER | SECOND POSITIVE ELECTRODE MIXTURE LAYER | | | FIRST NEGATIVE ELECTRODE MIXTURE LAYER | SECOND NEGATIVE ELECTRODE MIXTURE LAYER | | | HEAT RESISTANCE LAYER | | | |
| | FIRST BINDER | CONFIGU-RATION | SECOND BINDER | THICK-NESS RATIO | FIRST BINDER | CONFIGU-RATION | SECOND BINDER | THICK-NESS RATIO | THIRD LAYER | THICK-NESS | ARRANGE-MENT | RESISTANCE INCREASE RATE |
| | MASS% | — | MASS% | % | MASS% | — | MASS% | % | MASS% | μm | — | % |
| 13 | 2.0 | GRANULATED PARTICLE LAYER | 4.0 | 4 | 1.0 | GRANULATED PARTICLE LAYER | 4.0 | 12 | 4.0 | 4.5 | BOTH SURFACES | 50 |
| 14 | 2.0 | GRANULATED PARTICLE LAYER | 4.0 | 5 | 1.0 | GRANULATED PARTICLE LAYER | 4.0 | 12 | 4.0 | 4.5 | BOTH SURFACES | 14 |
| 15 | 2.0 | GRANULATED PARTICLE LAYER | 4.0 | 10 | 1.0 | GRANULATED PARTICLE LAYER | 4.0 | 12 | 4.0 | 4.5 | BOTH SURFACES | 9 |
| 16 | 2.0 | GRANULATED PARTICLE LAYER | 4.0 | 15 | 1.0 | GRANULATED PARTICLE LAYER | 4.0 | 12 | 4.0 | 4.5 | BOTH SURFACES | 13 |
| 17 | 2.0 | GRANULATED PARTICLE LAYER | 4.0 | 20 | 1.0 | GRANULATED PARTICLE LAYER | 4.0 | 12 | 4.0 | 4.5 | BOTH SURFACES | 16 |
| 18 | 2.0 | GRANULATED PARTICLE LAYER | 4.0 | 25 | 1.0 | GRANULATED PARTICLE LAYER | 4.0 | 12 | 4.0 | 4.5 | BOTH SURFACES | 55 |

FIG. 12

| SAMPLE No. | ELECTRODE |||||||| SEPARATOR |||| HIGH-RATE CYCLE TEST |
|---|---|---|---|---|---|---|---|---|---|---|---|---|---|
| | POSITIVE ELECTRODE |||| NEGATIVE ELECTRODE |||| HEAT RESISTANCE LAYER ||| | |
| | FIRST POSITIVE ELECTRODE MIXTURE LAYER | SECOND POSITIVE ELECTRODE MIXTURE LAYER ||| FIRST NEGATIVE ELECTRODE MIXTURE LAYER | SECOND NEGATIVE ELECTRODE MIXTURE LAYER ||| THIRD LAYER | THICK-NESS | ARRANGE-MENT | RESISTANCE INCREASE RATE |
| | FIRST BINDER | CONFIGU-RATION | SECOND BINDER | THICK-NESS RATIO | FIRST BINDER | CONFIGU-RATION | SECOND BINDER | THICK-NESS RATIO | | | | |
| | MASS% | — | MASS% | % | MASS% | — | MASS% | % | MASS% | μm | — | % |
| 19 | 2.0 | GRANULATED PARTICLE LAYER | 4.0 | 12 | 1.0 | GRANULATED PARTICLE LAYER | 2.5 | 12 | 4.0 | 4.5 | BOTH SURFACES | 65 |
| 20 | 2.0 | GRANULATED PARTICLE LAYER | 4.0 | 12 | 1.0 | GRANULATED PARTICLE LAYER | 3.0 | 12 | 4.0 | 4.5 | BOTH SURFACES | 16 |
| 21 | 2.0 | GRANULATED PARTICLE LAYER | 4.0 | 12 | 1.0 | GRANULATED PARTICLE LAYER | 5.0 | 12 | 4.0 | 4.5 | BOTH SURFACES | 11 |
| 22 | 2.0 | GRANULATED PARTICLE LAYER | 4.0 | 12 | 1.0 | GRANULATED PARTICLE LAYER | 8.0 | 12 | 4.0 | 4.5 | BOTH SURFACES | 15 |
| 23 | 2.0 | GRANULATED PARTICLE LAYER | 4.0 | 12 | 1.0 | GRANULATED PARTICLE LAYER | 10.0 | 12 | 4.0 | 4.5 | BOTH SURFACES | 18 |
| 24 | 2.0 | GRANULATED PARTICLE LAYER | 4.0 | 12 | 1.0 | GRANULATED PARTICLE LAYER | 12.0 | 12 | 4.0 | 4.5 | BOTH SURFACES | 75 |

FIG. 13

| SAMPLE No. | ELECTRODE ||||||||| SEPARATOR ||| HIGH-RATE CYCLE TEST |
|---|---|---|---|---|---|---|---|---|---|---|---|---|
| | POSITIVE ELECTRODE ||||| NEGATIVE ELECTRODE |||| HEAT RESISTANCE LAYER ||| RESISTANCE INCREASE RATE |
| | FIRST POSITIVE ELECTRODE MIXTURE LAYER | SECOND POSITIVE ELECTRODE MIXTURE LAYER ||| THICKNESS RATIO | FIRST NEGATIVE ELECTRODE MIXTURE LAYER | SECOND NEGATIVE ELECTRODE MIXTURE LAYER ||| THIRD LAYER | THICKNESS | ARRANGEMENT | |
| | FIRST BINDER | CONFIGURATION | SECOND BINDER | | | FIRST BINDER | CONFIGURATION | SECOND BINDER | THICKNESS RATIO | | | | |
| | MASS% | — | MASS% | % | MASS% | — | MASS% | % | MASS% | μm | — | % |
| 25 | 2.0 | GRANULATED PARTICLE LAYER | 4.0 | 12 | 1.0 | GRANULATED PARTICLE LAYER | 4.0 | 4 | 4.0 | 4.5 | BOTH SURFACES | 51 |
| 26 | 2.0 | GRANULATED PARTICLE LAYER | 4.0 | 12 | 1.0 | GRANULATED PARTICLE LAYER | 4.0 | 5 | 4.0 | 4.5 | BOTH SURFACES | 15 |
| 27 | 2.0 | GRANULATED PARTICLE LAYER | 4.0 | 12 | 1.0 | GRANULATED PARTICLE LAYER | 4.0 | 10 | 4.0 | 4.5 | BOTH SURFACES | 10 |
| 28 | 2.0 | GRANULATED PARTICLE LAYER | 4.0 | 12 | 1.0 | GRANULATED PARTICLE LAYER | 4.0 | 15 | 4.0 | 4.5 | BOTH SURFACES | 15 |
| 29 | 2.0 | GRANULATED PARTICLE LAYER | 4.0 | 12 | 1.0 | GRANULATED PARTICLE LAYER | 4.0 | 20 | 4.0 | 4.5 | BOTH SURFACES | 17 |
| 30 | 2.0 | GRANULATED PARTICLE LAYER | 4.0 | 12 | 1.0 | GRANULATED PARTICLE LAYER | 4.0 | 25 | 4.0 | 4.5 | BOTH SURFACES | 57 |

FIG. 14

| SAMPLE No. | ELECTRODE ||||||||| SEPARATOR |||| HIGH-RATE CYCLE TEST |
|---|---|---|---|---|---|---|---|---|---|---|---|---|---|---|
| | POSITIVE ELECTRODE |||| NEGATIVE ELECTRODE |||||| HEAT RESISTANCE LAYER ||| |
| | FIRST POSITIVE ELECTRODE MIXTURE LAYER | SECOND POSITIVE ELECTRODE MIXTURE LAYER ||| THICK-NESS RATIO | FIRST NEGATIVE ELECTRODE MIXTURE LAYER | SECOND NEGATIVE ELECTRODE MIXTURE LAYER ||| THICK-NESS RATIO | THIRD LAYER | THICK-NESS | ARRANGE-MENT | RESISTANCE INCREASE RATE |
| | FIRST BINDER | CONFIGU-RATION | SECOND BINDER | | | FIRST BINDER | CONFIGU-RATION | SECOND BINDER | | | | | | |
| | MASS% | — | MASS% | % | | MASS% | — | MASS% | % | MASS% | μm | — | % |
| 31 | 2.0 | GRANULATED PARTICLE LAYER | 4.0 | 12 | | 1.0 | GRANULATED PARTICLE LAYER | 4.0 | 12 | 2.5 | 4.5 | BOTH SURFACES | 54 |
| 32 | 2.0 | GRANULATED PARTICLE LAYER | 4.0 | 12 | | 1.0 | GRANULATED PARTICLE LAYER | 4.0 | 12 | 3.0 | 4.5 | BOTH SURFACES | 12 |
| 33 | 2.0 | GRANULATED PARTICLE LAYER | 4.0 | 12 | | 1.0 | GRANULATED PARTICLE LAYER | 4.0 | 12 | 5.0 | 4.5 | BOTH SURFACES | 8 |
| 34 | 2.0 | GRANULATED PARTICLE LAYER | 4.0 | 12 | | 1.0 | GRANULATED PARTICLE LAYER | 4.0 | 12 | 10.0 | 4.5 | BOTH SURFACES | 10 |
| 35 | 2.0 | GRANULATED PARTICLE LAYER | 4.0 | 12 | | 1.0 | GRANULATED PARTICLE LAYER | 4.0 | 12 | 30.0 | 4.5 | BOTH SURFACES | 11 |
| 36 | 2.0 | GRANULATED PARTICLE LAYER | 4.0 | 12 | | 1.0 | GRANULATED PARTICLE LAYER | 4.0 | 12 | 50.0 | 4.5 | BOTH SURFACES | 13 |
| 37 | 2.0 | GRANULATED PARTICLE LAYER | 4.0 | 12 | | 1.0 | GRANULATED PARTICLE LAYER | 4.0 | 12 | 70.0 | 4.5 | BOTH SURFACES | 15 |
| 38 | 2.0 | GRANULATED PARTICLE LAYER | 4.0 | 12 | | 1.0 | GRANULATED PARTICLE LAYER | 4.0 | 12 | 80.0 | 4.5 | BOTH SURFACES | 59 |

FIG. 15

| SAMPLE No. | ELECTRODE ||||||| SEPARATOR |||| HIGH-RATE CYCLE TEST |
|---|---|---|---|---|---|---|---|---|---|---|---|---|
| | POSITIVE ELECTRODE |||| NEGATIVE ELECTRODE |||| HEAT RESISTANCE LAYER ||| | |
| | FIRST POSITIVE ELECTRODE MIXTURE LAYER | SECOND POSITIVE ELECTRODE MIXTURE LAYER ||| FIRST NEGATIVE ELECTRODE MIXTURE LAYER | SECOND NEGATIVE ELECTRODE MIXTURE LAYER ||| THIRD LAYER | THICK-NESS | ARRANGE-MENT | RESISTANCE INCREASE RATE |
| | FIRST BINDER | CONFIGU-RATION | SECOND BINDER | THICK-NESS RATIO | FIRST BINDER | CONFIGU-RATION | SECOND BINDER | THICK-NESS RATIO | | | | |
| | MASS% | — | MASS% | % | MASS% | — | MASS% | % | MASS% | μm | — | % |
| 39 | 2.0 | GRANULATED PARTICLE LAYER | 4.0 | 12 | 1.0 | GRANULATED PARTICLE LAYER | 4.0 | 12 | 4.0 | 2.5 | BOTH SURFACES | 60 |
| 40 | 2.0 | GRANULATED PARTICLE LAYER | 4.0 | 12 | 1.0 | GRANULATED PARTICLE LAYER | 4.0 | 12 | 4.0 | 3.0 | BOTH SURFACES | 5 |
| 41 | 2.0 | GRANULATED PARTICLE LAYER | 4.0 | 12 | 1.0 | GRANULATED PARTICLE LAYER | 4.0 | 12 | 4.0 | 4.0 | BOTH SURFACES | 7 |
| 42 | 2.0 | GRANULATED PARTICLE LAYER | 4.0 | 12 | 1.0 | GRANULATED PARTICLE LAYER | 4.0 | 12 | 4.0 | 5.0 | BOTH SURFACES | 8 |
| 43 | 2.0 | GRANULATED PARTICLE LAYER | 4.0 | 12 | 1.0 | GRANULATED PARTICLE LAYER | 4.0 | 12 | 4.0 | 6.0 | BOTH SURFACES | 10 |
| 44 | 2.0 | GRANULATED PARTICLE LAYER | 4.0 | 12 | 1.0 | GRANULATED PARTICLE LAYER | 4.0 | 12 | 4.0 | 8.0 | BOTH SURFACES | 12 |
| 45 | 2.0 | GRANULATED PARTICLE LAYER | 4.0 | 12 | 1.0 | GRANULATED PARTICLE LAYER | 4.0 | 12 | 4.0 | 10.0 | BOTH SURFACES | 14 |
| 46 | 2.0 | GRANULATED PARTICLE LAYER | 4.0 | 12 | 1.0 | GRANULATED PARTICLE LAYER | 4.0 | 12 | 4.0 | 11.0 | BOTH SURFACES | 53 |

METHOD OF MANUFACTURING NONAQUEOUS ELECTROLYTE SECONDARY BATTERY AND NONAQUEOUS ELECTROLYTE SECONDARY BATTERY

INCORPORATION BY REFERENCE

The disclosure of Japanese Patent Application No. 2015-006820 filed on Jan. 16, 2015 including the specification, drawings and abstract is incorporated herein by reference in its entirety.

BACKGROUND OF THE INVENTION

1. Field of the Invention

The present invention relates to a method of manufacturing a nonaqueous electrolyte secondary battery and a nonaqueous electrolyte secondary battery.

2. Description of Related Art

Japanese Patent Application Publication No. 2003-151638 (JP 2003-151638 A) discloses a lithium ion secondary battery including an adhesive resin layer through which an electrode (positive electrode or negative electrode) and a separator are adhered to each other, in which the adhesive resin layer has a through-hole.

In JP 2003-151638 A, an adhesive resin solution containing a filler, a binder, and a solvent is adjusted and is applied to the separator. Before the adhesive resin solution is dried, the separator and the electrode are adhered to each other and then are dried. As a result, the separator and the electrode are integrated to obtain an electrode body.

However, it is considered that, in this state, the amount of a binder for adhesion decreases in an adhesive interface due to diffusion of the binder to pores of an electrode mixture layer. The adhesion strength between the electrode and the separator depends on the amount of the binder in the adhesive interface. Therefore, during high-rate cycles where expansion and shrinkage of the electrode are severe, it is expected that an adhesion state between the electrode and the separator is not able to be maintained. When the electrode and the separator are peeled off from each other to form a gap, an electrolytic solution flows to the outside of the electrode body through the gap. As a result, in the electrode body, the distribution of an electrolytic solution and a supporting electrolyte contained in the electrolytic solution is non-uniform, which promotes an increase in resistance caused by high-rate cycles.

SUMMARY OF THE INVENTION

According to the invention, an increase in resistance caused by high-rate cycles may be suppressed.

According to a first aspect of the invention, there is provided a method of manufacturing a nonaqueous electrolyte secondary battery, the method including: a first step of forming a first electrode mixture layer containing an electrode active material and a first binder; a second step of forming granulated particles containing the electrode active material and a second binder; a third step of forming a second electrode mixture layer, which is formed of the granulated particles, on the first electrode mixture layer; a fourth step of forming a heat resistance layer, which contains an inorganic filler and a third binder, on a surface of a separator; a fifth step of preparing an electrode body by laminating the electrode and the separator such that the second electrode mixture layer and the heat resistance layer are in contact with each other; and a sixth step of heating the electrode body.

In the above-described manufacturing method, the second binder and the third binder are fused together, and thus the electrode and the separator are integrated with each other. In the granulated particles containing the second binder, the amount of the solvent is less than that in, for example, an adhesive resin solution. Accordingly, when the second electrode mixture layer formed of the granulated particles are formed on the first electrode mixture layer, the second binder is diffused into the first electrode mixture layer, and thus a decrease in the amount of the binder for adhesion can be suppressed. As a result, the adhesive force is secured, and thus the peeling between the electrode and the separator can be suppressed during high-rate cycles. That is, the outflow of the electrolytic solution from the electrode body can be suppressed.

As described above, since a decrease in the amount of the binder in the adhesive interface can be suppressed, the addition amount of the binder can be reduced. As a result, an increase in resistance caused by high-rate cycles can be suppressed.

Melting points of the second binder and the third binder may be lower than melting points of the first binder and the separator.

Since the melting points of the second binder and the third binder are lower than the melting point of the first binder, the electrode and the separator can be fused together while suppressing the melting of the first binder contained in the first electrode mixture layer.

Since the melting points of the second binder and the third binder are lower than the melting point of the separator, the electrode and the separator can be fused together while suppressing a decrease in the air permeability of the separator.

In the sixth step, the electrode body may be heated to a temperature of 120° C. to 135° C. Within the above-described temperature range, the second binder and the third binder may be melted, and an effect on the member may be decreased.

In the sixth step, the electrode body may be heated while applying a pressure of 0.01 ton/cm$^2$ to 0.12 ton/cm$^2$ in a laminating direction of the electrode and the separator. Within the above-described range, the adhesive force between the electrode and the separator is improved.

According to a second aspect of the invention, there is provided a nonaqueous electrolyte secondary battery including an electrode body in which a positive electrode and a negative electrode are laminated with a separator interposed therebetween. At least one of the positive electrode and the negative electrode includes a first electrode mixture layer and a second electrode mixture layer provided on the first electrode mixture layer. The first electrode mixture layer contains an electrode active material and a first binder. The second electrode mixture layer is formed of granulated particles. The granulated particles contain the electrode active material and a second binder. A heat resistance layer is provided on a surface of the separator. The heat resistance layer contains an inorganic filler and a third binder and is fused to the second electrode mixture layer.

In the above-described nonaqueous electrolyte secondary battery, the second binder and the third binder are fused together, and thus the electrode and the separator strongly are adhered to each other. As a result, the outflow of the electrolytic solution from the electrode body can be suppressed. Further, the granulated particles are present in an adhesive interface between the second electrode mixture layer and the heat resistance layer. As a result, the second electrode mixture layer and the heat resistance layer are adhered to each other through point adhesion, and a gap having an appropriate size is formed in the adhesive interface. As a result, ion permeability is improved, and an increase in resistance caused by high-rate cycles can be suppressed.

Melting points of the second binder and the third binder may be lower than a melting point of the separator. That is, the melting points of the binders contained in the second electrode mixture layer and the heat resistance layer may be set to be lower than a shutdown temperature of the separator. According to the above-described configuration, when abnormal heat is generated, for example, during overcharge, the second binder and the third binder are melted to block the pores in the adhesive interface before the shutdown function of the separator starts to work. As a result, ion permeation is inhibited, and an increase in temperature can be suppressed.

The second binder and the third binder may be at least one of polyvinylidene fluoride having a melting point of 140° C. or lower and polyacrylonitrile having a melting point of 140° C. or lower. As long as the melting points thereof are 140° C. or lower, the second binder and the third binder may be a binder made of a copolymer of polyvinylidene fluoride and hexafluoropropylene. That is, the second binder and the third binder may be binders containing at least polyvinylidene fluoride (a binder made of a homopolymer of polyvinylidene fluoride or a binder made of a copolymer of polyvinylidene fluoride and hexafluoropropylene). High adhesion strength can be expected from these resins.

A ratio of a thickness of the second electrode mixture layer to a thickness of the first electrode mixture layer may be 5% to 20%. Within the above-described range, an effect of suppressing an increase in resistance caused by high-rate cycles is high.

According to the above-described aspects, an increase in resistance caused by high-rate cycles can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a table showing characteristics of Samples Nos. 1 to 6;

FIG. 10 is a table showing characteristics of Samples Nos. 7 to 12;

FIG. 11 is a table showing characteristics of Samples Nos. 13 to 18;

FIG. 12 is a table showing characteristics of Samples Nos. 19 to 24;

FIG. 13 is a table showing characteristics of Samples Nos. 25 to 30;

FIG. 14 is a table showing characteristics of Samples Nos. 31 to 38; and

FIG. 15 is a table showing characteristics of Samples Nos. 39 to 46.

DETAILED DESCRIPTION OF EMBODIMENTS

Hereinafter, an embodiment of the invention (hereinafter, referred to as "the embodiment") will be described in detail. However, the embodiment is not limited to the following description.

In the following description, "first positive electrode mixture layer and first negative electrode mixture layer" can be regarded as "first electrode mixture layer", and "second positive electrode mixture layer and second negative electrode mixture layer" can be regarded as "second electrode mixture layer". "Positive electrode granulated particles and negative electrode granulated particles" can be regarded as "granulated particles". "Positive electrode active material and negative electrode active material" can be regarded as "electrode active material". "First positive electrode binder and first negative electrode binder" can be regarded as "first binder", and "second positive electrode binder and second negative electrode binder" can be regarded as "second binder".

[Method of Manufacturing Nonaqueous Electrolyte Secondary Battery]

Figure 1:
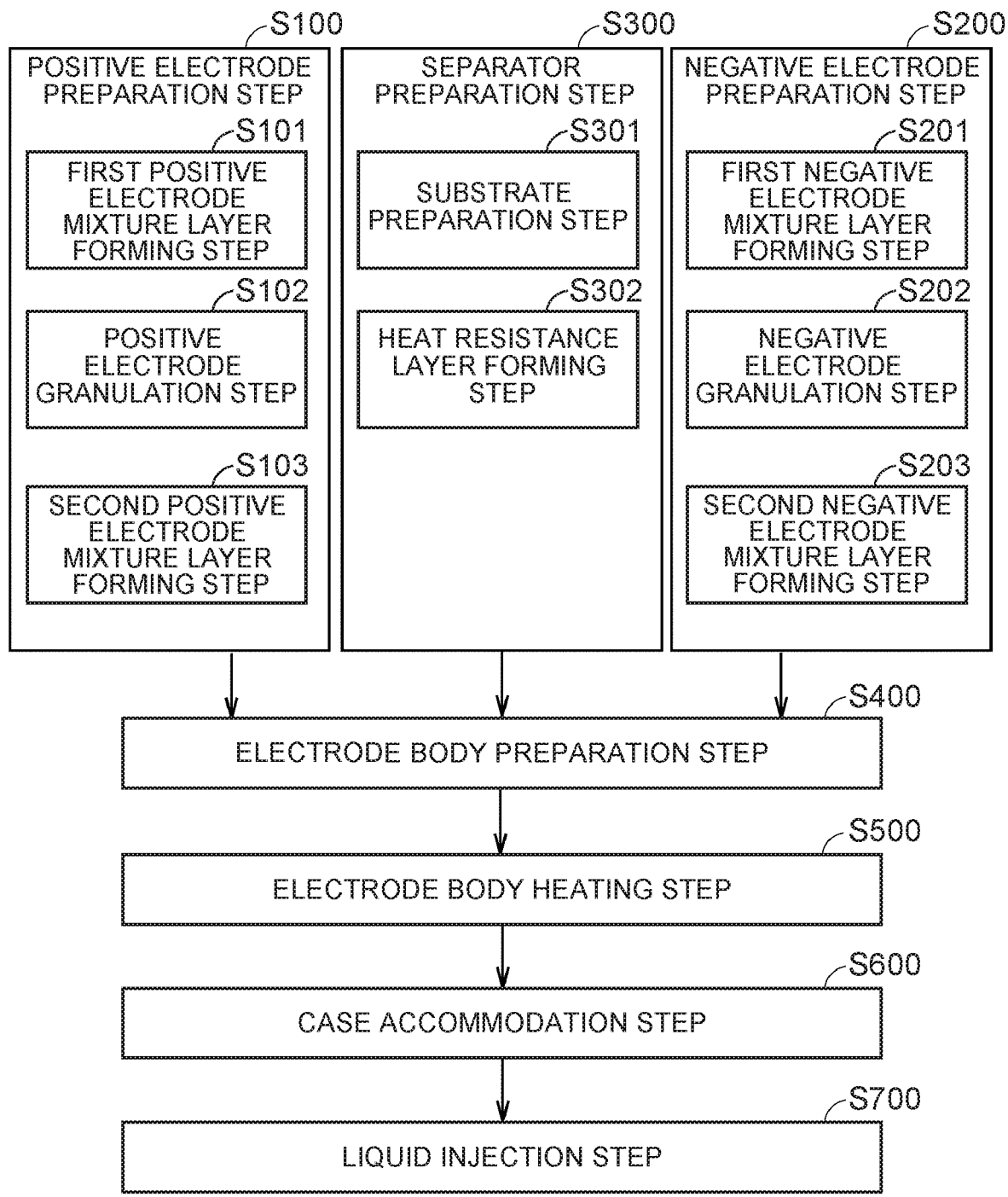
FIG. 1 is a flowchart showing the summary of a method of manufacturing a nonaqueous electrolyte secondary battery according to an embodiment of the invention.

FIG. 1 is a flowchart showing the summary of a method of manufacturing a nonaqueous electrolyte secondary battery according to the embodiment. As shown in FIG. 1, the manufacturing method includes a positive electrode preparation step (S100), a negative electrode preparation step (S200), a separator preparation step (S300), an electrode body preparation step (S400), an electrode body heating step (S500), a case accommodation step (S600), and a liquid injection step (S700). Hereinafter, an embodiment in which a separator and both electrodes of a positive electrode and a negative electrode are integrated with each other will be described. However, as long as the separator and any one of the positive electrode and the negative electrode are integrated with each other, an increase in resistance caused by high-rate cycles can be suppressed.

[Positive Electrode Preparation Step (S100)]

Figure 3:
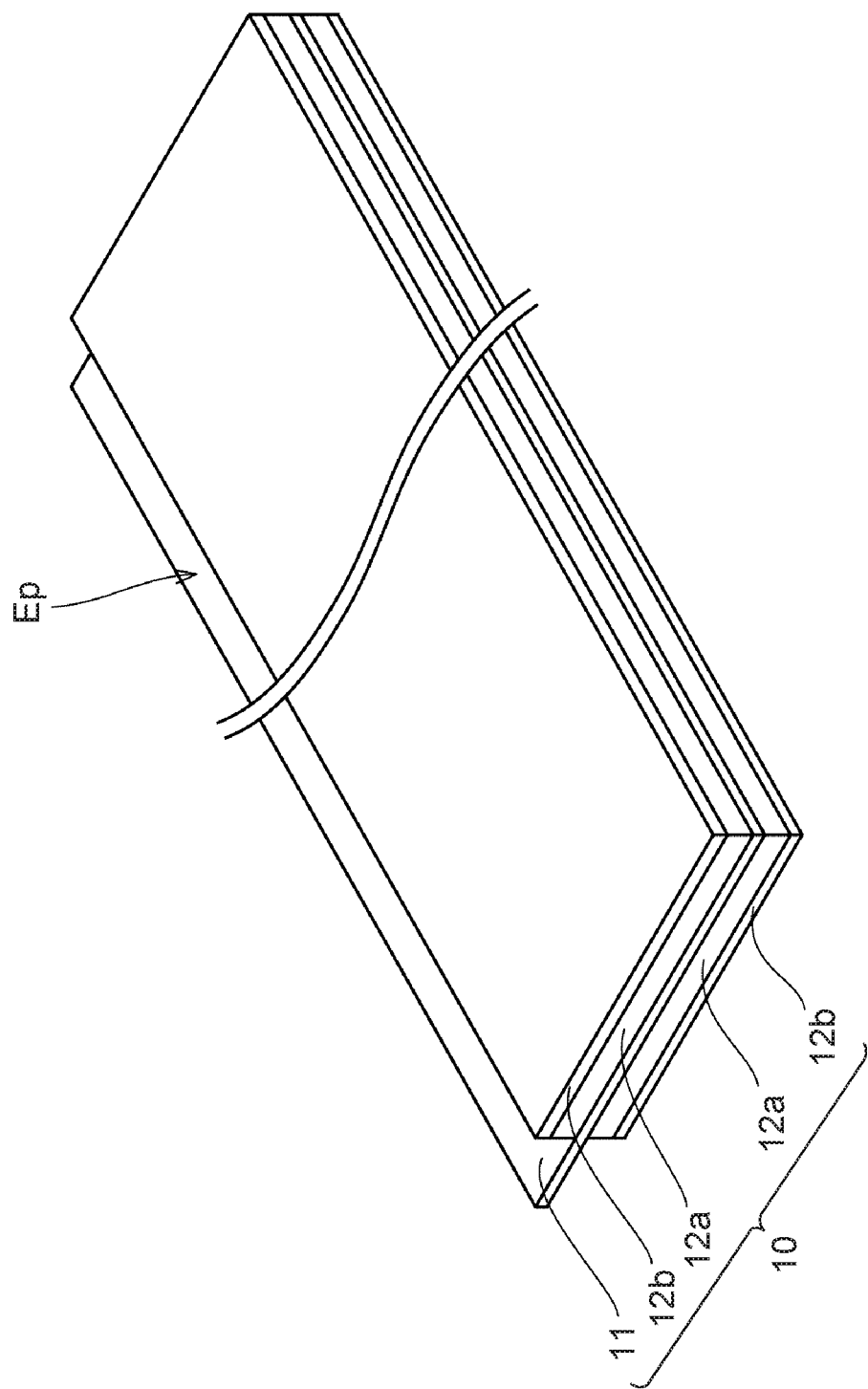
FIG. 3 is a schematic diagram showing a configuration example of a positive electrode according to the embodiment of the invention.

As shown in FIG. 1, the positive electrode preparation step includes a first positive electrode mixture layer forming step (S101), a positive electrode granulation step (S102), and a second positive electrode mixture layer forming step (S103). In the positive electrode preparation step, a positive electrode 10 shown in FIG. 3 is prepared.

[First Positive Electrode Mixture Layer Forming Step (S101)]

In the first positive electrode mixture layer forming step, a first positive electrode mixture layer 12*a* containing a first positive electrode binder is formed. In this step, first, a positive electrode mixture paste is prepared. The positive electrode mixture paste can be prepared using well-known means. For example, the positive electrode mixture paste can be prepared by kneading a positive electrode active material, a conductive material, and the first positive electrode binder with each other in a solvent. As the solvent, for example, N-methyl-2-pyrrolidone (NMP) can be used. The kneading machine may be, for example, a planetary mixer.

Next, a positive electrode current collector foil 11 is prepared. The positive electrode current collector foil is, for example, an aluminum (Al) foil. The first positive electrode mixture layer 12a can be formed by applying the positive electrode mixture paste to the positive electrode current collector foil 11 and drying the coating film. After drying, the first positive electrode mixture layer 12a may be rolled to adjust the thickness thereof.

The first positive electrode mixture layer 12a is not necessarily formed to be in contact with the positive electrode current collector foil 11. For example, a third positive electrode mixture layer may be formed between the first positive electrode mixture layer 12a and the positive electrode current collector foil 11. As in the case of a second positive electrode mixture layer 12b described below, the first positive electrode mixture layer may be formed of granulated particle. In this case, the manufacturing step can be simplified.

The positive electrode active material is not particularly limited. For example, the positive electrode active material may be $LiCoO_2$, $LiNiO_2$, $LiNi_aCo_bO_2$ (wherein, a+b=1, 0<a<1, and 0<b<1), $LiMnO_2$, $LiMn_2O_4$, $LiNi_aCo_bMn_cO_2$ (wherein, a+b+c=1, 0<a<1, 0<b<1, and 0<c<1), or $LiFePO_4$. The mixing amount of the positive electrode active material in the first positive electrode mixture layer may be, for example, 88.5 mass % to 91.5 mass %. For example, the conductive material may be acetylene black (AB). The mixing amount of the conductive material in the first positive electrode mixture layer may be, for example, 7 mass % to 9 mass %.

As the first positive electrode binder, a resin binder having a higher melting point than a second positive electrode binder described below may be used. As a result, the fixing strength of the first positive electrode mixture layer 12a is secured. The melting point of the first positive electrode binder may be higher than 140° C. The melting point of the first positive electrode binder may be higher than 150° C. or higher. The melting point of the first positive electrode binder may be 400° C. or lower. The first positive electrode binder may be, for example, polyvinylidene fluoride (PVDF) or polytetrafluoroethylene (PTFE). For example, the melting point of the first positive electrode binder can be adjusted based on the molecular weight. The mixing amount of the first positive electrode binder in the first positive electrode mixture layer may be, for example, 1.5 mass % to 2.5 mass %.

In this specification, "melting point of the resin" refers to a peak top temperature in differential scanning calorimetry (DSC) according to "JIS K 7121:2012 Testing methods for transition temperatures of plastics".

[Positive Electrode Granulation Step (S102)]

In the positive electrode granulation step, positive electrode granulated particles containing a positive electrode active material and a second positive electrode binder are formed. The positive electrode granulated particles can be prepared using well-known means. For example, the positive electrode granulated particles can be prepared by adding a predetermined amount of solvent to a positive electrode active material, a conductive material, and the second positive electrode binder and mixing the components with each other. As the solvent, for example, NMP can be used. The mixing machine may be, for example, a planetary mixer. The diameter of the positive electrode granulated particles may be adjusted to be, for example, about 0.5 mm to 2.0 mm. The solid content concentration of the positive electrode granulated particles may be, for example, about 70 mass % to 80 mass %.

As the positive electrode active material and the conductive material, the examples described in "first positive electrode mixture layer forming step" can be used. The mixing amount of the positive electrode active material in the positive electrode granulated particles may be, for example, 81 mass % to 90 mass %. The mixing amount of the conductive material in the positive electrode granulated particles may be, for example, 7 mass % to 9 mass %.

As the second positive electrode binder, a resin binder having a low melting point is used. This is because a heat treatment is performed at a low temperature to integrate the electrode and the separator with each other. It is preferable that, as the second positive electrode binder, a resin binder having a lower melting point than the first positive electrode binder described below is used. As a result, in the electrode body heating step, the melting of the first positive electrode binder can be suppressed. When the first positive electrode binder is melted, battery resistance may increase.

The melting point of the second positive electrode binder may be 140° C. or lower. The melting point of the second positive electrode binder may be, for example, 130° C. or higher. As the second positive electrode binder, for example, PVDF having a melting point of 140° C. or lower or polyacrylonitrile (PAN) having a melting point of 140° C. or lower is preferable. PVDF and PAN may be used in combination. The mixing amount of the second positive electrode binder in the positive electrode granulated particles may be, for example, 2.5 mass % to 12.0 mass %.

[Second Positive Electrode Mixture Layer Forming Step (S103)]

In the second positive electrode mixture layer forming step, a second positive electrode mixture layer 12b, which is formed of the positive electrode granulated particles, is formed on the first positive electrode mixture layer 12a. For example, the second positive electrode mixture layer 12b can be formed using an electrode preparation device 90 shown in FIG. 2. The operation of the electrode preparation device 90 is as follows.

Figure 2:
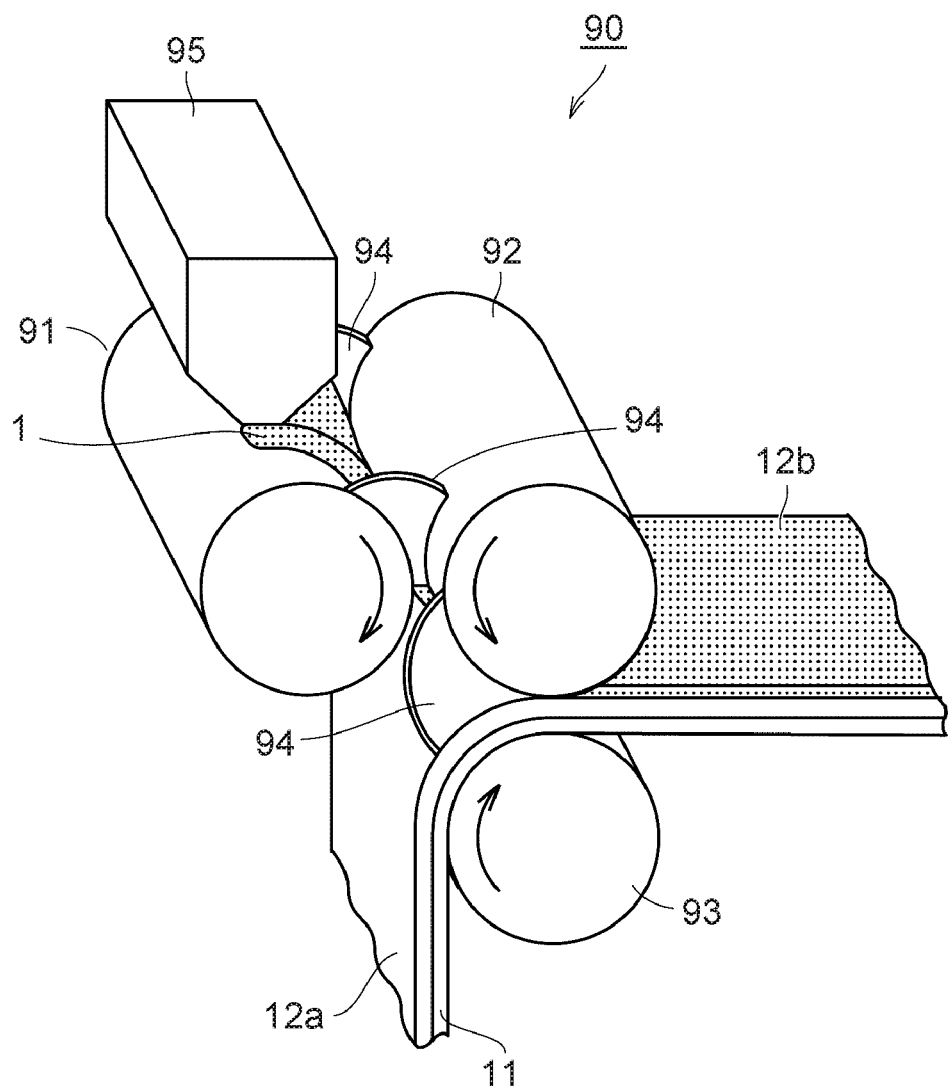
FIG. 2 is a schematic diagram showing an example of an electrode preparation device according to the embodiment of the invention.

The positive electrode granulated particles are supplied to a feeder 95. Plural positive electrode granulated particles 1 are supplied from the feeder 95 onto an A roller 91 or a B roller 92. In FIG. 2, arrows indicate rotating directions of the respective roller members. The plural positive electrode granulated particles 1 are transported along the A roller 91 or the B roller 92 in the arrow direction and reach a gap between the A roller 91 and the B roller 92. In the gap, pressure is applied from the A roller 91 and the B roller 92 to the plural positive electrode granulated particles 1 such that the plural positive electrode granulated particles 1 are formed into the sheet shaped second positive electrode mixture layer 12b. The width of the second positive electrode mixture layer 12b is adjusted by partition members 94. The coating mass (mass per unit area) and thickness of the second positive electrode mixture layer 12b are adjusted by the gap between the A roller 91 and the B roller 92.

The second positive electrode mixture layer 12b which has been formed into a sheet shape is transported along the B roller 92 in the arrow direction. The first positive electrode mixture layer 12a and the positive electrode current collector foil 11 are transported along a C roller 93 in the arrow direction. In the gap between the B roller 92 and the C roller 93, pressure is applied from the B roller 92 and the C roller 93 to the second positive electrode mixture layer 12b and the first positive electrode mixture layer 12a such that the second positive electrode mixture layer 12b is pressed against a surface of the first positive electrode mixture layer 12a.

As described above, in the granulated particles, the amount of the solvent is small. Therefore, the second positive electrode binder is not likely to be diffused and penetrate into the first positive electrode mixture layer 12a.

After being pressed, the second positive electrode mixture layer 12b may be dried using a drying furnace. The first positive electrode mixture layer 12a and the second positive electrode mixture layer 12b may be rolled to adjust the total thickness thereof. Next, by processing the whole body of the laminate to obtain a predetermined dimension, the positive electrode 10 shown in FIG. 3 is completed. In the positive electrode 10, a portion Ep where the positive electrode current collector foil 11 is exposed is provided for connection to an external terminal.

[Negative Electrode Preparation Step (S200)]

Figure 4:
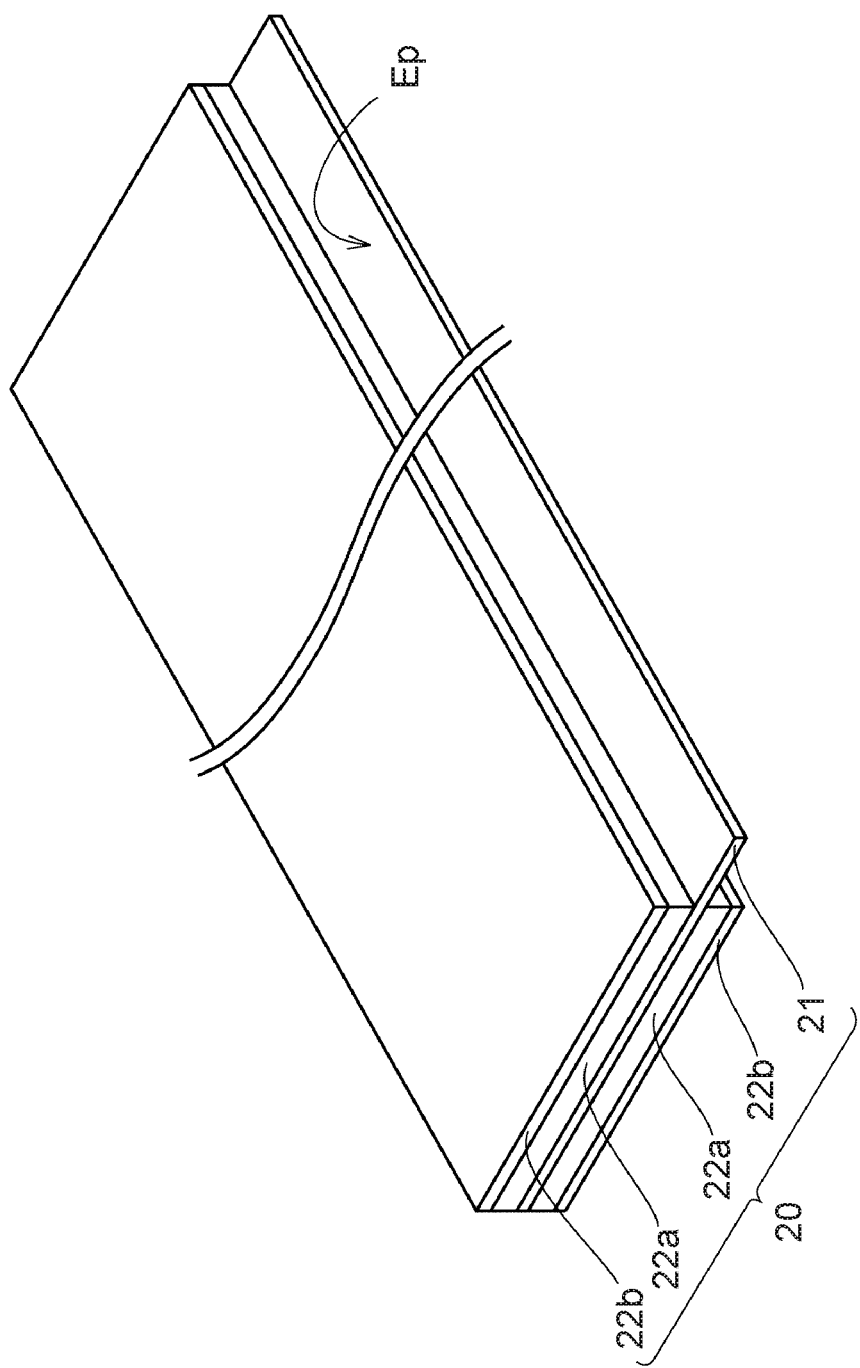
FIG. 4 is a schematic diagram showing a configuration example of a negative electrode according to the embodiment of the invention.

As shown in FIG. 1, the negative electrode preparation step includes a first negative electrode mixture layer forming step (S201), a negative electrode granulation step (S202), and a second negative electrode mixture layer forming step (S203). In the negative electrode preparation step, a negative electrode 20 shown in FIG. 4 is prepared.

[First Negative Electrode Mixture Layer Forming Step (S201)]

In the first negative electrode mixture layer forming step, a first negative electrode mixture layer 22a containing a first negative electrode binder is formed. In this step, first, a negative electrode mixture paste is prepared. The negative electrode mixture paste can be prepared using well-known means. For example, the negative electrode mixture paste can be prepared by kneading a negative electrode active material and the first negative electrode binder with each other in a solvent. As the solvent, for example, water or NMP can be used. When water is used as the solvent, for example, styrene-butadiene rubber (SRB) can be used as the first negative electrode binder. At this time, for example, a thickener such as carboxymethyl cellulose (CMC) may be used in combination. When NMP is used as the solvent, for example, PVDF can be used as the first negative electrode binder. The kneading machine may be, for example, a planetary mixer.

Next, a negative electrode current collector foil 21 is prepared. The negative electrode current collector foil is, for example, a copper (Cu) foil. The first negative electrode mixture layer 22a can be formed by applying the negative electrode mixture paste to the negative electrode current collector foil 21 and drying the coating film. After drying, the first negative electrode mixture layer 22a may be rolled to adjust the thickness thereof.

The first negative electrode mixture layer 22a is not necessarily formed to be in contact with the negative electrode current collector foil 21. For example, a third negative electrode mixture layer may be formed between the first negative electrode mixture layer 22a and the negative electrode current collector foil 21. The first negative electrode mixture layer may be formed of granulated particles.

The negative electrode active material is not particularly limited. For example, the negative electrode active material may be a carbon-based negative electrode active material such as graphite, amorphous coated graphite, or coke, or may be an alloy-based negative electrode active material such as silicon (Si) or tin (Sn). The mixing amount of the negative electrode active material in the first negative electrode mixture layer may be, for example, 98 mass % to 99 mass %. The mixing amount of the first negative electrode binder in the first negative electrode mixture layer may be, for example, 0.5 mass % to 1.0 mass %. When a thickener is used in combination, the mixing amount of the thickener in the first negative electrode mixture layer may be, for example, 0.5 mass % to 1.0 mass %.

[Negative Electrode Granulation Step (S202)]

In the negative electrode granulation step, negative electrode granulated particles containing a negative electrode active material and a second negative electrode binder are formed. The negative electrode granulated particles can be prepared using well-known means. For example, the negative electrode granulated particles can be prepared by adding a predetermined amount of solvent to a negative electrode active material and the second negative electrode binder and mixing the components with each other. As the negative electrode active material, the examples described in "first negative electrode mixture layer forming step" can be used. The mixing amount of the negative electrode active material in the negative electrode granulated particles may be, for example, 88 mass % to 97.5 mass %. As in the case of the second positive electrode binder, it is preferable that the second negative electrode binder is formed of at least one of PVDF having a melting point of 140° C. or lower and PAN having a melting point of 140° C. or lower. The solvent may be, for example, NMP. The mixing amount of the second negative electrode binder in the negative electrode granulated particles may be, for example, 2.5 mass % to 12.0 mass %.

[Second Negative Electrode Mixture Layer Forming Step (S203)]

In the second negative electrode mixture layer forming step, a second negative electrode mixture layer 22b, which is formed of the negative electrode granulated particles, is formed on the first negative electrode mixture layer 22a. As in the case of the second positive electrode mixture layer 12b, the second negative electrode mixture layer 22b can be formed using the electrode preparation device 90 shown in FIG. 2. Next, by processing the whole body of the laminate to obtain a predetermined dimension, the negative electrode 20 shown in FIG. 4 is completed. In the negative electrode 20, a portion Ep where the negative electrode current collector foil 21 is exposed is provided for connection to an external terminal.

[Separator Preparation Step (S300)]

In the separator preparation step, a separator on which a heat resistance layer is formed is prepared.

[Substrate Preparation Step (S301)]

First, a separator as a substrate is prepared. The separator is, for example, a porous resin layer having plural pores. The separator may be a porous layer formed of, for example, polyethylene (PE) or polypropylene (PP). The separator may have a single-layer structure or a multi-layer structure. When having a multi-layer structure, it is preferable that the separator includes two or more porous resin layers having different pore sizes. For example, the separator may have a three-layer structure in which three porous layers, a PP layer, a PE layer, and a PP layer are laminated in this order. The thickness of the separator may be, for example, 10 μm to 30 μm.

The separator may have a shutdown function. The shutdown function is a function of blocking the pores in the porous layer of the separator at a predetermined temperature so as to stop ion permeation. The temperature at which the pores are blocked is called a shutdown temperature. When the separator has a multi-layer structure, at least one layer may have the shutdown function. The shutdown temperature of the separator is a temperature near the melting point of the constituent resin. The melting point of the separator may be set to be higher than those of the second positive electrode binder, the second negative electrode binder, and a third binder described below. As a result, temperature conditions where the electrode and the separator can be integrated with each other can be selected while suppressing a change of the pores of the separator.

[Heat Resistance Layer Forming Layer (S302)]

In a heat resistance layer forming layer, a heat resistance layer, which contains an inorganic filler and a third binder, is formed on a surface of a separator. First, a paste for forming the heat resistance layer is prepared. This paste can be prepared using well-known means. For example, the paste can be prepared by kneading an inorganic filler and the third binder with each other in a solvent. As the solvent, for example, water or NMP can be used. For example, a thickener such as CMC may be used in combination. As a kneading machine, for example, an ultrasonic disperser "CLEARMIX" (manufactured by M Technique Co., Ltd.) is preferable. Next, the paste is applied to a surface of the separator, and the coating film is dried. As a result, the heat resistance layer can be formed. An application method may be a gravure coating method.

The inorganic filler is not particularly limited. For example, the following inorganic fillers can be used.

α-alumina (D50: 0.2 μm to 1.2 μm, BET: 1.3 $m^2$/g to 50 $m^2$/g)

Boehmite (D50: 0.2 μm to 1.8 μm, BET: 2.8 $m^2$/g to 50 $m^2$/g)

Titania (D50: 0.2 μm to 1.0 μm, BET: 2.0 $m^2$/g to 50 $m^2$/g)

Zirconia (D50: 0.2 μm to 1.0 μm, BET: 2.0 $m^2$/g to 50 $m^2$/g)

Magnesia (D50: 0.2 μm to 1.0 μm, BET: 2.0 $m^2$/g to 50 $m^2$/g)

Here, "D50" refers to a particle size corresponding to a cumulative value of 50% in a particle size distribution obtained using a laser diffraction scattering method. "BET" refers to a specific surface area which is measured using a BET method. The mixing amount of the inorganic filler in the heat resistance layer may be, for example, 30 mass % to 97 mass %.

As the third binder, a resin which is fusible at a low temperature can be used as in the case of the second positive electrode binder and the second negative electrode binder. The third binder may be, for example, PVDF having a melting point of 140° C. or lower or PAN having a melting point of 140° C. or lower. Alternatively, PVDF and PAN may be used in combination. The second positive electrode binder, the second negative electrode binder, and the third binder may be formed of the same resin. The mixing amount of the third binder in the heat resistance layer may be, for example, 3 mass % to 70 mass %.

[Electrode Body Preparation Step (S400)]

Figure 5:
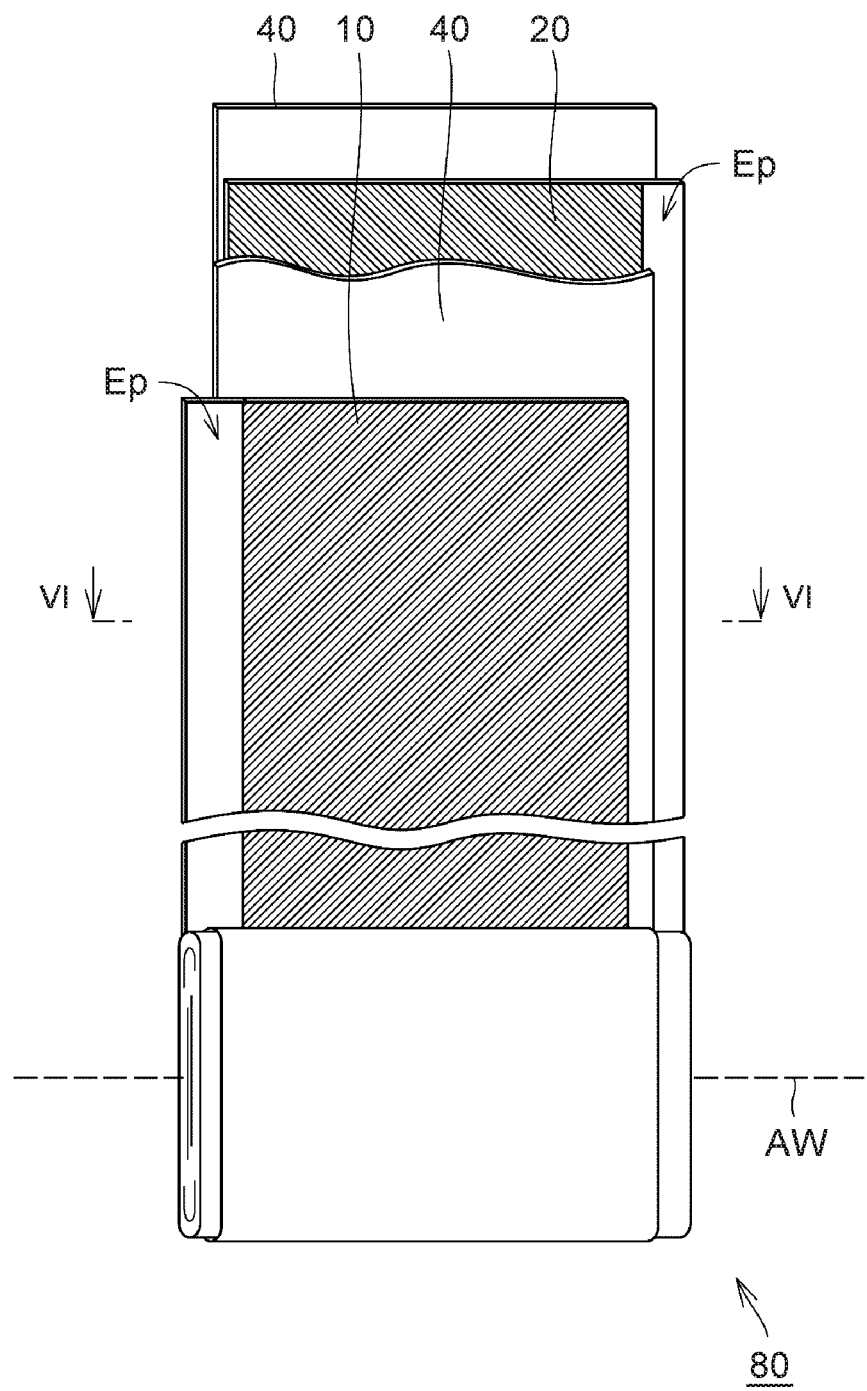
FIG. 5 is a schematic diagram showing a configuration example of an electrode body according to the embodiment of the invention.

In the electrode body preparation step, as shown in FIG. 5, an electrode body 80 is prepared by laminating the positive electrode 10 and the negative electrode 20 with separators 40 interposed therebetween to obtain a laminate and winding the laminate. During winding, the tension applied to the separators may be, for example, about 0.35 N/$mm^2$ to 4.3 N/$mm^2$. Here, the tension refers to tension applied per sectional area of the separators. The respective members are wound around a winding axis AW. At this time, the portions Ep where the electrode current collector foils are exposed are arranged in end portions in a direction moving along the winding axis AW. The electrode body is not necessarily a wound type. For example, the electrode body may be prepared by alternately laminating the positive electrode and the negative electrode with the separators interposed therebetween.

Figure 6:
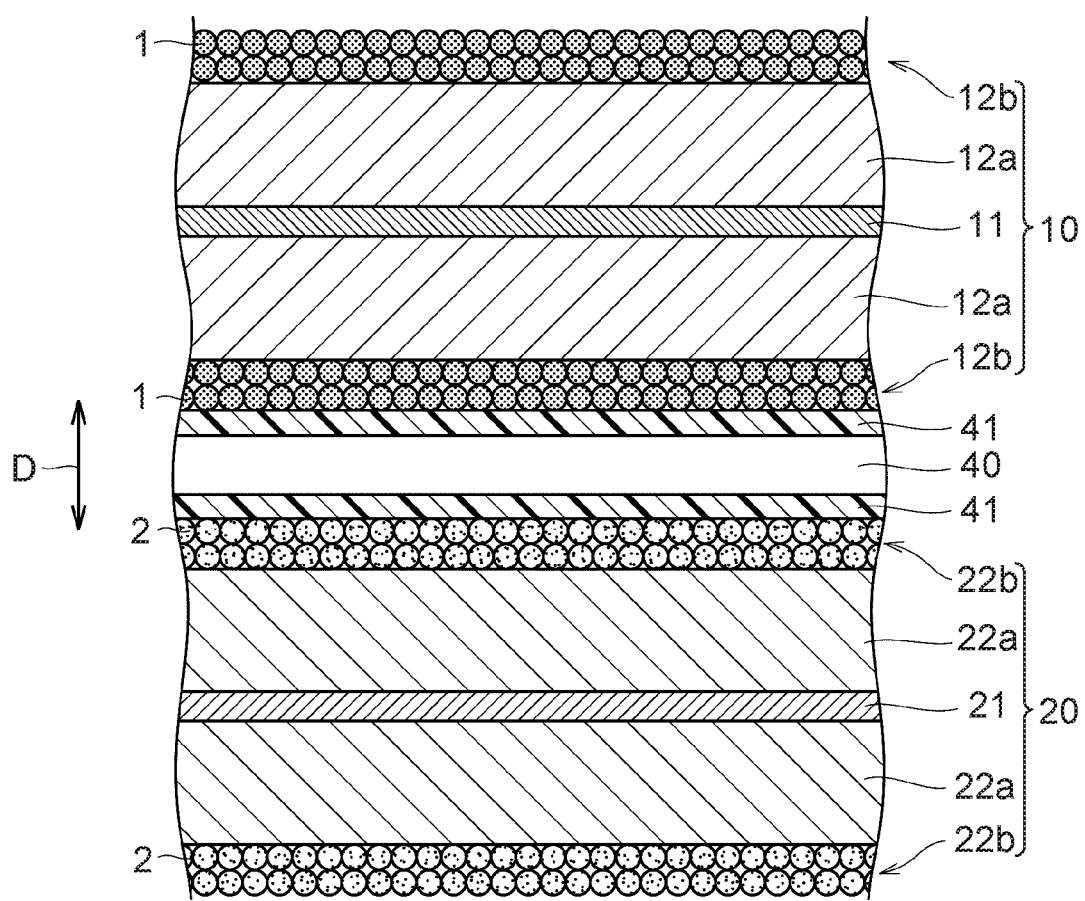
FIG. 6 is a schematic partial sectional view taken along line VI-VI of FIG. 5.

FIG. 6 is a schematic partial sectional view taken along line VI-VI of FIG. 5. In FIG. 6, an arrow indicates a laminating direction D of the positive electrode, the negative electrode, and the separator. As shown in FIG. 6, in this step, the positive electrode 10 and the separator 40 are laminated such that the second positive electrode mixture layer 12b and a heat resistance layer 41 are in contact with each other. In addition, the negative electrode 20 and the separator 40 are laminated such that the second negative electrode mixture layer 22b and the heat resistance layer 41 are in contact with each other. After being wound, the electrode body is formed into a flat shape.

[Electrode Body Heating Step (S500)]

In the electrode body heating step, the electrode body is heated. For example, the electrode body is stored in an oven set to a predetermined temperature for a predetermined amount of time. Due to heating, the second positive electrode binder contained in the second positive electrode mixture layer and the third binder contained in the heat resistance layer are fused together. In addition, the second negative electrode binder contained in the second negative electrode mixture layer and the third binder contained in the heat resistance layer are fused together. As a result, an electrode body is manufactured in which the separator and the electrode are integrated with each other.

For example, the heating temperature may be lower than the melting points of the second positive electrode binder, the second negative electrode binder, and the third binder by about 5° C. to 10° C. Specifically, the heating temperature may be 120° C. to 135° C. The lower limit of the heating temperature may be 125° C., and the upper limit thereof may be 130° C.

The electrode body may be heated while applying pressure thereto. That is, the electrode body may be heated while applying a predetermined pressure in the laminating direction of the positive electrode, the separator, and the negative electrode. For example, pressure can be applied to the electrode body by pressing the electrode body with two flat plates. At this time, the pressure may be, for example, 0.01 ton/$cm^2$ to 0.12 ton/$cm^2$. The lower limit of the pressure may be 0.03 ton/$cm^2$ or 0.05 ton/$cm^2$. The upper limit of the pressure may be 0.10 ton/$cm^2$ or 0.08 ton/$cm^2$.

[Case Accommodation Step (S600)]

Figure 7:
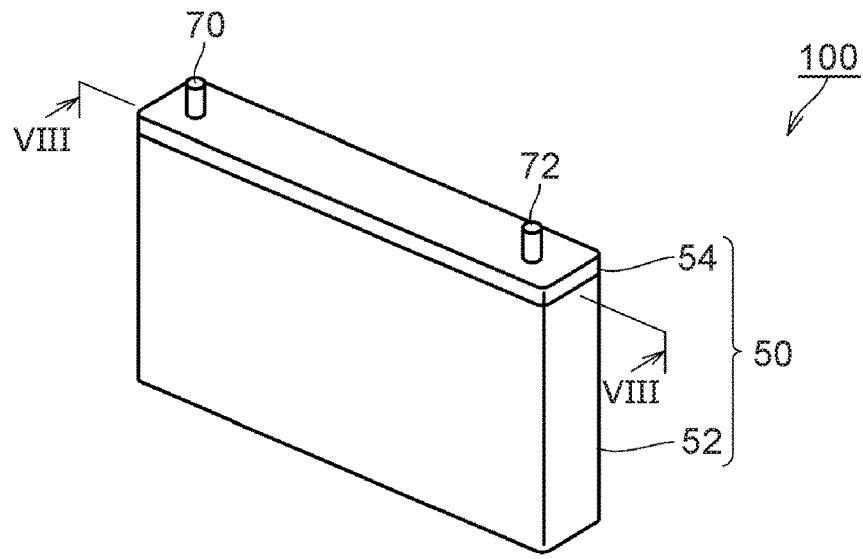
FIG. 7 is a schematic diagram showing an example of a nonaqueous electrolyte secondary battery according to the embodiment of the invention.

In the case accommodation step, the electrode body is accommodated in an external case. As shown in FIG. 7, an external case 50 includes, for example, a bottomed square case body 52 and a sealing plate 54. A positive electrode terminal 70 and a negative electrode terminal 72 are provided on the sealing plate 54. In the external case 50, for example, a liquid injection hole, a safety valve, and a current interrupt device (all of which are not shown) may be provided. The external case is formed of, for example, an Al alloy.

Figure 8:
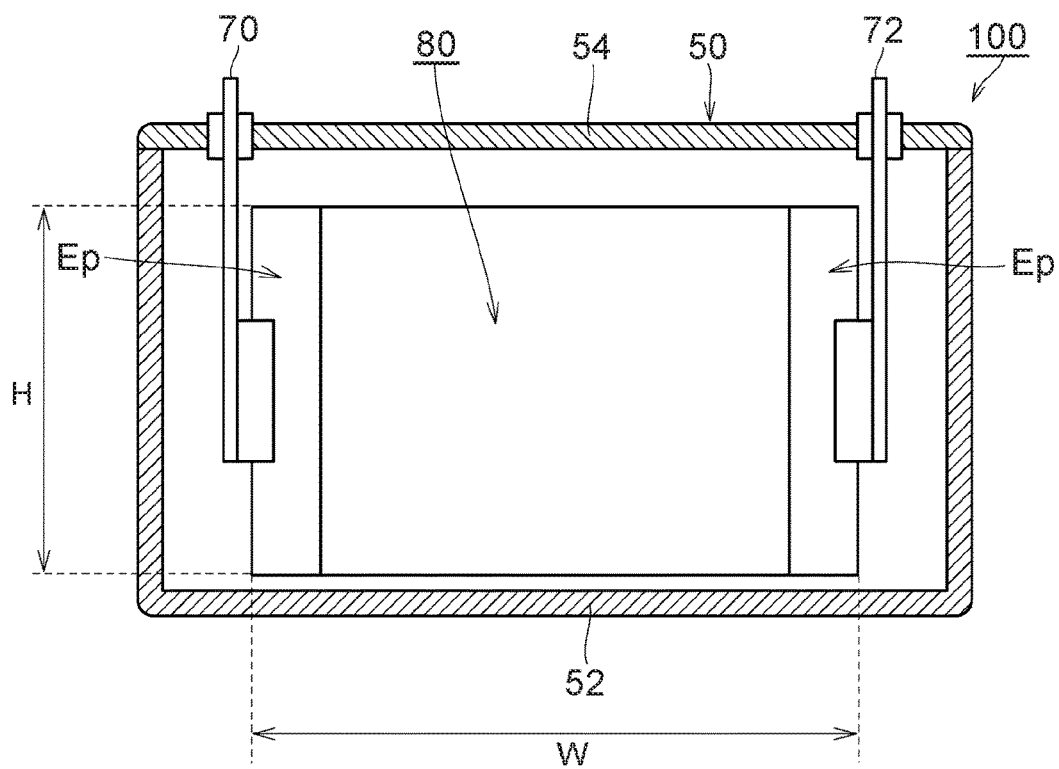
FIG. 8 is a schematic sectional view taken along line VIII-VIII of FIG. 7.

FIG. 8 is a schematic sectional view taken along line VIII-VIII of FIG. 7. As shown in FIG. 8, the electrode body 80 is accommodated in the external case 50. At this time, the electrode body 80 is connected to the positive electrode terminal 70 and the negative electrode terminal 72 in the portions Ep where the current collector foils are exposed.

[Liquid Injection Step]

In the liquid injection step, an electrolytic solution is injected into the external case. The electrolytic solution can be injected, for example, through a liquid injection hole provided on the external case 50. After the injection, the liquid injection hole is sealed using predetermined means.

The electrolytic solution is a liquid electrolyte in which a supporting electrolyte is dissolved in a nonaqueous solvent. The nonaqueous solvent may be: a cyclic carbonate such as ethylene carbonate (EC), propylene carbonate (PC), butylene carbonate (BC), or γ-butyrolactone (γBL); or may be a chain carbonate such as dimethyl carbonate (DMC), ethyl methyl carbonate (EMC), or diethyl carbonate (DEC). Among these nonaqueous solvents, a combination of two or more kinds may be used. From the viewpoint of electrical conductivity and electrochemical stability, a mixture of a cyclic carbonate and a chain carbonate may be used. At this time, a volume ratio of the cyclic carbonate to the chain carbonate may be, for example, about 1:9 to 5:5.

The supporting electrolyte may be, for example, Li salts such as $LiPF_6$, $LiBF_4$, $LiClO_4$, $LiAsF_6$, $Li(CF_3SO_2)_2N$, $Li(FSO_2)_2N$ or $LiCF_3SO_3$. Among these supporting electrolytes, a combination of two or more kinds may be used. The concentration of the Li salt in the electrolytic solution may be, for example, about 0.5 mol/L to 2.0 mol/L.

The electrolytic solution may contain an additive. Examples of the additive which can be used in the embodiment include Li salts containing an oxalato complex as an anion such as lithium bis(oxalato)borate ($LiB(C_2O_4)_2$), lithium difluoro(oxalato)borate ($LiBF_2(C_2O_4)$), and lithium difluorobis(oxalato)phosphate ($LiPF_2(C_2O_4)_2$); and other additives such as lithium difluorophosphate ($LiPO_2F_2$), vinylene carbonate (VC), vinyl ethylene carbonate (VEC), fluoroethylene carbonate (FEC), ethylene sulfite (ES), propane sultone (PS), and lithium bis(trifluoromethanesulfonyl) imide (LiTFSI).

By performing the above-described steps, a nonaqueous electrolyte secondary battery according to the embodiment can be manufactured.

<Nonaqueous Electrolyte Secondary Battery>

FIG. 7 is a schematic diagram showing a configuration example of the nonaqueous electrolyte secondary battery according to the embodiment. Typically, a battery 100 can be manufactured using the above-described method of manufacturing a nonaqueous electrolyte secondary battery.

As shown in FIG. 8, the battery 100 includes the electrode body 80. As shown in FIG. 5, the electrode body 80 is obtained by laminating the positive electrode 10 and the negative electrode 20 with the separators 40 interposed therebetween to obtain a laminate and winding the laminate. FIG. 6 is a schematic partial sectional view taken along line VI-VI of FIG. 5.

As shown in FIG. 6, the positive electrode 10 includes: the first positive electrode mixture layer 12a; and the second positive electrode mixture layer 12b provided on the first positive electrode mixture layer 12a. The first positive electrode mixture layer 12a contains the positive electrode active material and the first positive electrode binder. The second positive electrode mixture layer 12b is made of the positive electrode granulated particles 1. The positive electrode granulated particles 1 contains the positive electrode active material and the second positive electrode binder.

The negative electrode 20 includes: the first negative electrode mixture layer 22a; and the second negative electrode mixture layer 22b provided on the first negative electrode mixture layer 22a. The first negative electrode mixture layer 22a contains the negative electrode active material and the first negative electrode binder. The second negative electrode mixture layer 22b is made of negative electrode granulated particles 2. The negative electrode granulated particles 2 contains the negative electrode active material and the second negative electrode binder.

The heat resistance layer 41 is provided on a surface of the separator 40. The heat resistance layer 41 contains the inorganic filler and the third binder.

In the embodiment, the second positive electrode mixture layer 12b and the heat resistance layer 41 are fused together. That is, the second positive electrode binder contained in the second positive electrode mixture layer 12b and the third binder contained in the heat resistance layer 41 are fused together. Thus, the second positive electrode mixture layer 12b and the heat resistance layer 41 are integrated with each other. As a result, the outflow of the electrolytic solution caused when the positive electrode 10 and the separator 40 are peeled off from each other in the electrode body 80 can be suppressed.

In the embodiment, the positive electrode granulated particles 1 are present in an adhesive interface between the second positive electrode mixture layer 12b and the heat resistance layer 41. Therefore, a gap having an appropriate size can be formed in the adhesive interface, which promotes ion permeation. As a result, an increase in resistance caused by high-rate cycles can be suppressed.

The thickness of the first positive electrode mixture layer 12a may be, for example, 25 μm to 85 μm. The thickness of the second positive electrode mixture layer 12b may be, for example, 1.25 μm to 17 μm. A ratio of the thickness of the second positive electrode mixture layer 12b to the thickness of the first positive electrode mixture layer 12a may be, for example, 4% to 25%. Within the above-described range, an increase in resistance caused by high-rate cycles can be suppressed. The ratio of the thickness of the second positive electrode mixture layer 12b to the thickness of the first positive electrode mixture layer 12a is calculated by dividing the thickness of the second positive electrode mixture layer 12b by the thickness of the first positive electrode mixture layer 12a. The lower limit of the thickness ratio may be 5% or 10%. The upper limit of the thickness ratio may be 15%. Within the above-described range, the improvement of the effect of suppressing an increase in resistance can be expected.

In the embodiment, the second negative electrode mixture layer 22b and the heat resistance layer 41 are fused together. That is, the second negative electrode binder contained in the second negative electrode mixture layer 22b and the third binder contained in the heat resistance layer 41 are fused together. Thus, the second negative electrode mixture layer 22b and the heat resistance layer 41 are integrated with each other. As a result, the outflow of the electrolytic solution caused when the negative electrode 20 and the separator 40 are peeled off from each other in the electrode body 80 can be suppressed.

In the embodiment, the negative electrode granulated particles 2 are present in an adhesive interface between the second negative electrode mixture layer 22b and the heat resistance layer 41. Therefore, a gap having an appropriate size can be formed in the adhesive interface, which promotes ion permeation. As a result, an increase in resistance caused by high-rate cycles can be suppressed.

The thickness of the first negative electrode mixture layer 22a may be, for example, 40 μm to 140 μm. The thickness of the second negative electrode mixture layer 22b may be, for example, 2 μm to 28 μm. A ratio of the thickness of the second negative electrode mixture layer 22b to the thickness of the first negative electrode mixture layer 22a may be 4% to 25%. Within the above-described range, an increase in resistance caused by high-rate cycles can be suppressed. The ratio of the thickness of the second negative electrode mixture layer 22b to the thickness of the first negative electrode mixture layer 22a is calculated by dividing the thickness of the second negative electrode mixture layer 22b by the thickness of the first negative electrode mixture layer 22a. The lower limit of the thickness ratio may be 5% or 10%. The upper limit of the thickness ratio may be 15%. Within the above-described range, the improvement of the effect of suppressing an increase in resistance can be expected.

The thickness of the heat resistance layer 41 may be, for example, 2.5 μm to 11 μm. The lower limit of the thickness of the heat resistance layer may be 3.0 μm or 4.0 μm. The upper limit of the thickness of the heat resistance layer may be 10 μm or 8 μm.

The thickness of the separator 40 may be, for example, 10 μm to 30 μm. It is preferable that the melting points of the second positive electrode binder, the second negative electrode binder, and the third binder is lower than that of the separator. As a result, the shutdown function can be imparted to the second positive electrode mixture layer 12b and the heat resistance layer 41 to the second negative electrode mixture layer 22b and the heat resistance layer 41. That is, when abnormal heat is generated, for example, during overcharge, the binder contained in each layer is melted to block the pores of the layer before the shutdown function of the separator starts to work. As a result, during an abnormal situation, ion permeation can be suppressed. When the temperature further increases, the separator is shut down. By ion permeation being suppressed in multiple steps during an abnormal situation, the improvement of the safety of the battery can be expected. The second positive electrode binder, the second negative electrode binder, and the third binder may be, for example, PVDF having a melting point of 140° C. or lower or PAN having a melting point of 140° C. or lower. Among these resins, one kind may be used alone, or two or more kinds may be used in combination.

In the battery 100, the positive electrode capacity and the negative electrode capacity are adjusted by selecting the active materials and by adjusting the addition amounts thereof. A positive and negative electrode capacity ratio (negative electrode capacity÷positive electrode capacity) may be, for example, about 1.7 to 2.0.

Hereinabove, the embodiment has been described above but is not limited to the above description. As described above, the electrode body according to the embodiment may be a laminate electrode body. In addition, the embodiment may be a laminate battery.

Hereinafter, the embodiment will be described in more detail using Examples. However, the embodiment is not limited to the following Examples.

[Manufacturing of Nonaqueous Electrolyte Secondary Battery]

Samples Nos. 1 to 46 were manufactured using the following method. Sample No. 2 corresponds to Comparative Example, and the other samples correspond to Examples of the invention.

[Sample No. 1]

1. Preparation of Positive Electrode 1-1. Formation of First Positive Electrode Mixture Layer A first positive electrode mixture layer was formed by applying a positive electrode mixture paste to both main surfaces of a positive electrode current collector foil. The configuration of the first positive electrode mixture layer was as follows.

Positive electrode active material: $LiNi_{1/3}Co_{1/3}Mn_{1/3}O_2$
Conductive material: acetylene black
First positive electrode binder: PVDF (melting point: 155° C.)
Composition of Mixture: (positive electrode active material:conductive material:first positive electrode binder=90:8:2)
Thickness of first positive electrode mixture layer: 68 μm
Positive electrode current collector foil: Al foil (thickness: 15 μm)

1-2. Formation of Second Positive Electrode Mixture Layer

Using the electrode preparation device shown in FIG. 2, a second positive electrode mixture layer was formed of granulated particles and was pressed against the first positive electrode mixture layer. The configuration of the second positive electrode mixture layer was as follows.

Positive electrode active material: $LiNi_{1/3}Co_{1/3}Mn_{1/3}O_2$
Conductive material: acetylene black
Second positive electrode binder: PVDF (melting point: 135° C.)
Composition of Mixture: (positive electrode active material:conductive material:second positive electrode binder=88:8:4)
Diameter of positive electrode granulated particles: 1.0 mm
Thickness of second positive electrode mixture layer: 7.5 μm 2. Manufacture of Negative Electrode 2-1. Formation of First Negative Electrode Mixture Layer A first negative electrode mixture layer was formed by applying a negative electrode mixture paste to both main surfaces of a negative electrode current collector foil. The configuration of the first negative electrode mixture layer was as follows.

Negative electrode active material: amorphous coated graphite
Thickener: CMC
First negative electrode binder: SBR (glass transition point: −20° C. to 10° C.)
Composition of Mixture: (negative electrode active material:thickener:first negative electrode binder=98:1:1)
Thickness of first negative electrode mixture layer: 80 μm
Negative electrode current collector foil: Cu foil (thickness: 10 μm)

2-2. Formation of Second Negative Electrode Mixture Layer

Using the electrode preparation device shown in FIG. 2, a second negative electrode mixture layer was formed of granulated particles and was pressed against a surface of the first negative electrode mixture layer. The configuration of the second negative electrode mixture layer was as follows.

Negative electrode active material: amorphous coated graphite
Second negative electrode binder: PVDF (melting point: 135° C.)
Composition of Mixture: (negative electrode active material:second negative electrode binder=96:4)
Diameter of negative electrode granulated particles: 1.0 mm
Thickness of second negative electrode mixture layer: 8.8 μm 3. Preparation of Separator A heat resistance layer was formed on both surfaces of a separator including a PE single layer by applying a paste containing an inorganic filler and a third binder thereto. The configuration of the separator was as follows.

Separator: PE single layer (thickness: 20 µm)
Inorganic filler: α-alumina (D50: 0.7 µm, BET: 15 m$^2$/g)
Third binder: PVDF (melting point: 135° C.)
Composition of heat resistance layer: (inorganic filler: third binder=95.9:4.1)
Thickness of heat resistance layer: 4.5 µm 4. Formation of Electrode Body The positive electrode, the negative electrode, and the separator were laminated to obtain a laminate such that the second positive electrode mixture layer and the second negative electrode mixture layer were in contact with the heat resistance layers formed on both surfaces of the separator, and the laminate was wound. As a result, an elliptical electrode body was prepared. Further, the elliptical electrode body was formed into a flat shape. The total number of laminated layers in the separator of the electrode body was 130. The external dimensions of the electrode body 80 shown in FIG. 8 were as follows.

Width W: 130 mm
Height H: 50 mm

5. Heating of Electrode Body

The electrode body was interposed between two flat plates, and the periphery thereof was restricted by a jig. As a result, a pressure of 0.06 ton/cm$^2$ was applied to the electrode body. While maintaining this state, the electrode body was stored in an oven set to 130° C. for a predetermined amount of time. As a result, the second positive electrode binder and the third binder were fused together, and the second negative electrode binder and the third binder were fused together. As a result, the electrodes and the separator were integrated with each other.

6. Case Accommodation

As shown in FIG. 8, the electrode body 80, the positive electrode terminal 70, and the negative electrode terminal 72 were connected to each other, and then the electrode body 80 was accommodated in the external case 50.

7. Liquid Injection Step

An electrolytic solution having the following composition was prepared.

Supporting electrolyte: LiPF$_6$ (1.1 mol/L)
Nonaqueous solvent: (EC:EMC:DMC=3:3:4 (volume ratio))
Additives: LiB(C$_2$O$_4$)$_2$, LiPO$_2$F$_2$ The electrolytic solution was injected through the liquid injection hole of the external case, and the liquid injection hole was sealed to seal the inside of the external case.

In this way, a nonaqueous electrolyte secondary battery according to Sample No. 1 was manufactured. In this battery, the positive and negative electrode capacity ratio was 1.85, and the rated capacity was 4 Ah.

[Sample No. 2]

Sample No. 2 was obtained using the same method as in Sample No. 1, except that, as shown in FIG. 9, the second positive electrode mixture layer and the second negative electrode mixture layer were formed as coating layers, that is, the second positive electrode mixture layer and the second negative electrode mixture layer were formed of a paste.

In FIG. 9, "Coating Layer" refers to a layer formed by applying the paste, and "Granulated Particle Layer" refers to a layer made of granulated particles. In FIG. 9, the first positive electrode binder and the first negative electrode binder are represented by "First Binder", and the second positive electrode binder and the second negative electrode binder are represented by "Second Binder".

[Samples Nos. 3 and 4]

Samples Nos. 3 and 4 were obtained using the same method as in Sample No. 1, except that, as shown in FIG. 9: the heat resistance layer was formed only on a single surface of the separator; and the positive electrode, the negative electrode, and the separator were laminated such that the heat resistance layer was arranged on the positive electrode side or the negative electrode side.

[Samples Nos. 5 and 6]

Samples Nos. 5 and 6 were obtained using the same method as in Sample No. 1, except that, as shown in FIG. 9, any one of the second positive electrode mixture layer and the second negative electrode mixture layer was changed to the coating layer.

[Samples Nos. 7 to 12]

Samples Nos. 7 to 12 were obtained using the same method as in Sample No. 1, except that the mixing amount of the second positive electrode binder in the second positive electrode mixture layer was changed as shown in FIG. 10.

[Samples Nos. 13 to 18]

Samples Nos. 13 to 18 were obtained using the same method as in Sample No. 1, except that the ratio of the thickness of the second positive electrode mixture layer to the thickness of the first positive electrode mixture layer was changed as shown in FIG. 11.

[Samples Nos. 19 to 24]

Samples Nos. 19 to 24 were obtained using the same method as in Sample No. 1, except that the mixing amount of the second negative electrode binder in the second negative electrode mixture layer was changed as shown in FIG. 12.

[Samples Nos. 25 to 30]

Samples Nos. 25 to 30 were obtained using the same method as in Sample No. 1, except that the ratio of the thickness of the second negative electrode mixture layer to the thickness of the first negative electrode mixture layer was changed as shown in FIG. 13.

[Samples Nos. 31 to 38]

Samples Nos. 31 to 38 were obtained using the same method as in Sample No. 1, except that the mixing amount of the third binder in the heat resistance layer was changed as shown in FIG. 14.

[Samples Nos. 39 to 46]

Samples Nos. 39 to 46 were obtained using the same method as in Sample No. 1, except that the thickness of the heat resistance layer was changed as shown in FIG. 15.

[High-Rate Cycle Test]

A resistance increase rate of each sample was measured in a high-rate cycle test. It is considered that an increase in resistance in the high-rate cycle test was caused by the outflow of the electrolytic solution from the electrode body.

1000 charging-discharging cycles in which subsequent charging→rest→discharging→rest was set as one cycle were performed under the following conditions.

Charging: 2.5 C×240 sec
Rest: 120 seconds
Discharging: 30 C×20 sec
Rest: 120 seconds Here, the unit "C" for the current value refers to the current value at which the rated capacity of a battery is completely discharged in 1 hour.

The resistance increase rate was calculated from the following expression:

Resistance Increase Rate={(Resistance after 1000 Cycles)−(Resistance before Cycles)}÷(Resistance before Cycles)×100. The results are shown in FIGS. 9 to 15.

[Results and Discussion]

1. Samples Nos. 1 to 6

It was found from FIG. 9 that an increase in resistance was able to be significantly suppressed in Sample No. 1 in which the second positive electrode mixture layer and the second negative electrode mixture layer were formed of granulated particles and were fused to the heat resistance layer. It is considered that, since the second positive electrode binder and the second negative electrode binder as the binders for adhesion were contained in granulated particles, a decrease in the amount of the binder was able to be suppressed in the adhesive interface. Since the granulated particles are present in the adhesive interface, a gap having an appropriate size was formed to promote ion permeation, which contributed to the suppression of an increase in resistance.

In Sample No. 2 in which the second positive electrode mixture layer and the second negative electrode mixture layer were formed as paste coating layers, a resistance increase rate was high. It is considered that, since the amount of the solvent in the paste was large, the second binder was diffused to the first electrode mixture layer as a lower layer, which decreased the amount of the binder in the adhesive interface. It is considered that, on the surface of the first electrode mixture layer, pores are blocked by the second binder to inhibit ion permeation, which contributed to an increase in resistance.

It was able to be verified from the results of Samples Nos. 3 to 6 that, since the second electrode mixture layer in at least one of the electrodes was formed of granulated particles and was fused to the heat resistance layer, an increase in resistance was able to be suppressed.

2. Samples Nos. 7 to 12

The effect of suppressing an increase in resistance was able to be verified from FIG. 10 when the mixing amount of the second positive electrode binder was within a range of 2.5 mass % to 12.0 mass %. Further, it was able to be verified that the effect was high when the mixing amount of the second positive electrode binder was within a range of 3.0 mass % to 10.0 mass %.

3. Samples Nos. 13 to 18

The effect of suppressing an increase in resistance was able to be verified from FIG. 11 when the ratio of the thickness of the second positive electrode mixture layer to the thickness of the first positive electrode mixture layer was within a range of 4% to 25%. Further, it was able to be verified that the effect was high when the ratio of the thickness of the second positive electrode mixture layer to the thickness of the first positive electrode mixture layer was within a range of 5% to 20%.

4. Samples Nos. 19 to 24

The effect of suppressing an increase in resistance was able to be verified from FIG. 12 when the mixing amount of the second negative electrode binder was within a range of 2.5 mass % to 12.0 mass %. Further, it was able to be verified that the effect was high when the mixing amount of the second negative electrode binder was within a range of 3.0 mass % to 10.0 mass %.

5. Samples Nos. 25 to 30

The effect of suppressing an increase in resistance was able to be verified from FIG. 13 when the ratio of the thickness of the second negative electrode mixture layer to the thickness of the first negative electrode mixture layer was within a range of 4% to 25%. Further, it was able to be verified that the effect was high when the ratio of the thickness of the second negative electrode mixture layer to the thickness of the first negative electrode mixture layer was within a range of 5% to 20%.

6. Samples Nos. 31 to 38

The effect of suppressing an increase in resistance was able to be verified from FIG. 14 when the mixing amount of the third binder in the heat resistance layer was within a range of 2.5 mass % to 80.0 mass %. Further, it was able to be verified that the effect was high when the mixing amount of the third binder in the heat resistance layer was within a range of 3.0 mass % to 70.0 mass %.

7. Samples Nos. 39 to 46

The effect of suppressing an increase in resistance was able to be verified from FIG. 15 when the thickness of the heat resistance layer was within a range of 2.5 μm to 11 μm. Further, it was able to be verified that the effect was high when the thickness of the heat resistance layer was within a range of 3 μm to 10 μm.

Hereinabove, the embodiment and the examples of the invention have been described. It is primarily intended that the configurations of the embodiment and the examples can be appropriately combined.

The embodiment and Examples disclosed herein are merely exemplary in all respects and are not particularly limited.

What is claimed is:

1. A nonaqueous electrolyte secondary battery comprising:
   an electrode body in which a positive electrode and a negative electrode are laminated with a separator interposed therebetween,
   wherein the positive electrode includes a first positive electrode mixture layer containing a positive electrode active material and a first positive electrode binder, and a second positive electrode mixture layer made of positive electrode granulated particles containing the positive electrode active material and a second positive electrode binder, the second positive electrode mixture layer provided on the first positive electrode mixture layer,
   the negative electrode includes a first negative electrode mixture layer containing a negative electrode active material and a first negative binder, and a second negative electrode mixture layer made of negative electrode granulated particles containing the negative electrode active material and a second negative binder,
   a first heat resistance layer is provided between the positive electrode and the separator and is fused to the second positive electrode mixture layer,
   a second heat resistance layer is provided between the negative electrode and the separator and is fused to the second negative electrode mixture layer,
   the first heat resistance layer and the second heat resistance layer each contains an inorganic filler and a third binder,
   the positive electrode granulated particles have a diameter of 0.5 mm to 2.0 mm,
   the second positive electrode binder and the second negative electrode binder are each fused together with the third binder,
   the second positive electrode binder in the second positive electrode mixture layer and the second negative electrode binder in the second negative electrode mixture layer are contained in an amount of 3.0 mass % to 10.0 mass %,
   an amount of the third binder in the heat resistance layer is 3 mass % to 70 mass %, and a ratio of a thickness of the second positive electrode mixture layer to a thickness of the first positive electrode mixture layer and a ratio of a thickness of the second negative electrode mixture layer to a thickness of the first negative electrode mixture layer are 5% to 20%.

2. The nonaqueous electrolyte secondary battery according to claim 1, wherein
melting points of the second positive electrode binder, the second negative electrode binder, and the third binder are lower than a melting point of the separator.

3. The nonaqueous electrolyte secondary battery according to claim 1, wherein
the second positive electrode binder, the negative electrode binder and the third binder are at least one of polyvinylidene fluoride having a melting point of 140° C. or lower and polyacrylonitrile having a melting point of 140° C. or lower.

4. The nonaqueous electrolyte secondary battery according to claim 1, wherein the second positive electrode mixture layer and the first heat resistance layer are adhered to each other through point adhesion and the second negative electrode mixture layer and the second heat resistance layer are adhered to each other through point adhesion.

5. The nonaqueous electrolyte secondary battery according to claim 1, wherein a thickness of the first heat resistance layer and the second heat resistance layer is 3.0 µm to 10.0 µm.

* * * * *